United States Patent [19]
Chauvin

[11] Patent Number: 5,579,724
[45] Date of Patent: Dec. 3, 1996

[54] OYSTER HOLDER FOR OYSTER GROWING SYSTEM

[76] Inventor: Leroy J. Chauvin, 237 Mary Ann Ave., Houma, La. 70363

[21] Appl. No.: 280,213

[22] Filed: Jul. 25, 1994

[51] Int. Cl.$^6$ ............................................. A01K 61/00
[52] U.S. Cl. .......................................................... 119/237
[58] Field of Search .................................. 119/218, 236, 119/237

[56] References Cited

U.S. PATENT DOCUMENTS

| | | | |
|---|---|---|---|
| 3,572,292 | 3/1971 | Quayle et al. | 119/237 |
| 3,738,318 | 6/1973 | Woodbridge et al. | 119/237 |
| 4,133,294 | 1/1979 | Bolton et al. | |
| 4,214,551 | 7/1980 | McNeil et al. | 119/218 |
| 4,844,015 | 7/1989 | Garvey et al. | 119/237 |
| 4,906,653 | 3/1990 | Kiehs et al. | 514/388 |

FOREIGN PATENT DOCUMENTS 2061081  5/1981  United Kingdom ............ 119/237

*Primary Examiner*—Robert P. Swiatek
*Attorney, Agent, or Firm*—C. Emmett Pugh; Pugh/Associates

[57] ABSTRACT

Holders (10) for growing individual oysters each including a cup-like member (12) having a lip (20) defining a cylindrical cavity (16) of a size sufficient to allow a seedling or juvenile oyster to be at least partially, and preferably completely, placed therein prior to the juvenile oyster's setting with the oyster's hinge located at the cavity's rear. At least one aperture (24/26; 124/126) is formed through the cavity's bottom and side walls with dimensions sufficient to prevent the seedling or juvenile oyster from passing through the aperture(s) but large enough to allow the oyster spat to initially anchor itself to the holder by growing into the aperture(s). The holder further includes a flared, radially extending, shelf extension portion (14) into which the lip of the cavity leads. The shelf portion along with the higher, underside side of the lip directs the growth of the growing oyster's shell over the shelf as it grows up past and outside of the walls of the cup-like member. The shelf portion includes protrusions (34, 36) on or apertures (134, 136) in, respectively, its bottom surface to or into which the oyster shell becomes permanently attached as the oyster grows and incorporates the holder into its shell, with the holder remaining on the oyster when it is provided to the consumer for consumption on the half-shell. The underside of the holder includes a flat portion (44A) for labeling the oyster as to, for example, its producer and/or the geographical location of its harvesting.

18 Claims, 4 Drawing Sheets

OYSTER HOLDER FOR OYSTER GROWING SYSTEM

TECHNICAL FIELD

The present invention relates to devices and methods for growing and also identifying oysters and more particularly to devices and methods for growing and identifying oysters which provide a structure upon which the oyster may be set and become permanently attached and which can be labeled for identification with a label that stays with the oyster until opened.

Background Art

It has become increasingly difficult for people working in the oyster industry to harvest a steady, wholesome supply of oysters that are safe for consumption on, for example, the half-shell due to a shrinking supply of natural areas in which uncultivated oysters naturally reproduce and grow.

In addition, the oyster industry is facing a shrinking demand caused by a lack of consumer confidence in the product's safety, particularly due to environmental pollution concerns and not absolutely knowing the area from which an oyster might have been harvested. Thus, for example, various, limited geographical locations may be declared closed due to pollution, while most areas are still considered safe, but the over-all oyster market suffers because the public cannot independently verify the area from which an oyster came before consuming it.

Thus, public confidence in the safety of consuming oysters on the half-shell is decreasing as the public becomes increasingly aware of the dangers of consuming contaminated oysters. This lack of confidence is caused by the public's growing awareness that prime oyster producing areas are becoming surrounded by areas in which elevated pollution and bacterial conditions make the production of half-shell oysters unsafe; and, the fact that half-shell oyster consumers are unable to readily or independently identify either the producer or locality of production of the oysters. This inability of consumers to make this type of identification allows unscrupulous seafood producers and distributors to pass off oysters grown in unsafe areas for oysters produced in areas under safe and wholesome growing conditions.

The present invention provides a device which becomes permanently attached to a juvenile oyster and which can be used, for example, to identify for the consumer the producer who produced the oyster and/or the location from where the oyster was produced.

In addition to the lack of consumer confidence in the product itself, competition for this type of oyster and over-harvesting of the prime production areas has lead to a declining supply. Attempts have been made to increase production by releasing into these areas large quantities of juvenile oysters and spat. When the oyster is ready to set, it grows a foot and attaches itself to an object and grows to maturity. However, one of the problem with this approach is that the juvenile oysters and spat are free swimming creatures, and there is no way to control where the juvenile oysters will set or permanently anchor themselves to grow to maturity. Thus, in a natural setting, man has no control over where the oysters set.

Although the locations where oysters set generally have little current flow, the optimal location for oyster growth is one which has more current to supply the oyster with food and nutrients. These higher current areas are also capable of supporting larger populations of oysters. In the past, after locating the set oysters, oyster growers have taken the oysters from their setting location and moved them to higher current areas. This procedure requires locating and harvesting each oyster twice before the oyster is ready for market.

It thus is desirable to have a device or system approach which allows a producer to obtain juvenile oysters from a hatchery and to confidently place the oysters within an area suitable for the production of, for example, safe half-shell oysters.

It is even more desirable to have a device or system approach which would identify the producer of the oyster and would also allow a producer to obtain juvenile oysters from a hatchery and to confidently place the oysters in an area suitable for the production of half-shell oysters.

There have been various attempts to provide devices and methods for marking oysters, however, none of the prior devices and methods provide a readily identifiable way of doing so.

A list of prior patents which may be of interest is provided below:

| U.S. Pat. No. | Inventor(s) | Issue Date |
| --- | --- | --- |
| 3,738,318 | Woodbridge et al | 06/12/73 |
| 4,133,294 | Bolton et al | 01/09/79 |
| 4,906,653 | Kiehs et al | 03/06/90 |

U.S. Pat. No. 4,133,294, issued to Bolton et al, on Jan. 9, 1979, describes a method of marking a large number of mollusks permanently by exposing the mollusks to a concentration of tetracycline for a period of days. The marking resulting from this method is only weakly visible under normal lighting conditions and requires an ultraviolet light to see readily. This patent also refers to prior attempts to mark mollusks by individually gluing tags to the mollusk shells.

U.S. Pat. No. 3,738,318, issued to Woodbridge et al, describes an artificial "cultch" apparatus for growing oysters. The cultch comprises a concrete base having a plurality of rods embedded therein. The rods each have a plurality of metal cans connected thereto, which can be sprayed with gunnite or concrete in order to provide an improved growing surface.

The other listed patent is included only for general background information.

Neither of the devices and/or methods discussed above satisfactorily identifies to the consumer the identity of the producer or the location where the oysters were produced. In addition, neither of these devices and/or methods satisfactorily contributes to solving the problem of decreasing production areas or in any way suggest the innovative growing or harvesting aspects of the present invention.

The present invention is designed to over-come these shortcomings and deficiencies in the prior art.

GENERAL SUMMARY DISCUSSION OF THE INVENTION

It is thus an object of the invention to provide a holder, preferably cup-like in general design, which enhances the production and harvesting of oysters by providing a structure upon which an individual oyster can set and to which it can become in its natural growth process integrally attached, as part of a better way of growing and harvesting oysters.

It is a further object of the invention to provide a cup-like holder to which an oyster shell will permanently adhere.

It is a still further an object of the invention to provide a holder and associated method which will allow a producer to obtain seedling or juvenile oysters from a hatchery and to confidently place the oysters within a general area suitable for the production of safe oysters to be consumed, for example, on the half-shell.

It is a still further object of the invention to provide a holder which provides an indicia area for, for example, identifying the location where an individual oyster was produced and which becomes permanently attached to the oyster at an early stage in the oyster's development.

It is still a further object of the present invention to provide a holder which simultaneously will accomplish all or at least multiple ones of the foregoing objects.

Accordingly, the present invention is directed to the use of many such holders for individually growing oysters, with each oyster in its growth stage incorporating its respective holder, with each set of two ultimately becoming firmly and integrally affixed together.

The invention, in its most preferred embodiment, provides a two (2) phase system for growing oysters from the seed oyster stage to the fully grown, edible stage, using a special holder having a cup-like member, into which the seed oyster, typically about comparable in size to the human fingernail, is placed and which stays with the oyster all the way to the end use of the oyster at, for example, an oyster bar. In the first stage, which typically takes of the order of a few months, the oysters in their initial growing stage are maintained on, for example, a horizontal base to ensure that they stay within the cup-like member; and then in the second phase, by which time the oysters have firmly integrated their respective holders into their shells in their natural growth, the growing oysters are, if so desired, suspended from a vertically arrayed frame positioned down in a water environment until ultimately the oysters are fully grown. However, with appropriate procedures and holders, the process could begin with a vertical disposition, or the entire growth process could be carried out in a horizontal disposition.

In the preferred embodiments each individual oyster holder comprises a cup-like member having a lip at least generally surrounding a cavity or lower bottom surface, with the lip providing one or more side wall portions tending to keep the oyster set or seedling initially within the "cup" at least until the two become integrated together. The cup-like cavity is of a size sufficient to allow a juvenile oyster or at least a seedling to be at least partially, and preferably completely, received therein prior to the juvenile oyster's or the seedling's setting.

The cup-like cavity also includes at least one aperture formed through at least one of its surfaces with sufficiently small enough dimensions or size to prevent a juvenile oyster or seedling placed in the cup-like cavity from passing through the aperture but of sufficient size to allow the juvenile oyster or seedling in its setting to grow a part of its shell into the aperture(s), initially physically anchoring the oyster to the holder by natural growth.

A further purpose of the aperture is to allow water to freely enter and exit the cavity in order to supply the growing oyster with nutrients and oxygen to remove its waste products. The cavity surface may include more than one aperture, and multiple apertures are preferred and are selectively placed in the cup-like cavity, preferably in the rear of the cup-like member, preferably in its rear wall and bottom.

In a preferred embodiment, the holder, with its preferred cylindrical-shaped cavity, may further include a shelf portion or extension that adjoins one side of the lip of the cavity and extends radially out therefrom and having a softly curved bottom, preferably similar to that of the cupped human hand. The shelf portion directs the growth of the growing oyster's shell in a desired direction. The shelf portion may include projecting or indented portions attached to or integrally formed with the shelf portion to which the oyster shell may become further permanently attached as its shell further incorporates those portions into itself in its natural growth. It is also possible to include one or more apertures through the shelf portion for the same purpose.

The shelf portion can include serrations or other irregular peripheries along at least a segment of its peripheral edge in order to increase the bonding of the oyster to the holder, or the peripheral edges can be smooth. However, ultimately, it is preferred that the over-all holder be of a size in which the oyster ultimately grows out over and past most if not all of the holder's complete periphery, so that the holder becomes part of the bottom of the oyster shell, preferably covering over a substantial part of the bottom.

Thus, by the time the oyster is sufficiently grown to be harvested, the oyster shell and the holder are affixedly and integrally attached together, and the grown oyster is shipped or otherwise provided to the consumer with the outer, bottom surface of the oyster covered over at least in large part by the holder itself.

Additionally, the back, bottom or underside surface of the extended shelf portion preferably is smooth and flat at least over a significant part thereof and thereby be adapted to receive a label or to function as such itself by the information being integrally formed in the holder or by providing a writing surface upon which indicia can be added or written or otherwise be used as a convenient surface to display information indica. This allows the bottom of the oyster, via the holder structure, to be "labeled" as to, for example, its producer and/or the area in which the oyster was grown and harvested, or with other desirable indicia or branding. When it comes time to serve the consumer the oyster on the half-shell, the consumer can then check the bottom of the oyster shell and note the contents of its labeling on the holder.

In order to efficiently direct the growth of the oyster shell in a desired direction, the shelf portion should adjoin the lip less than about three (3 cm) centimeters from the bottom of the cavity, with the lip structure preferably flowing smoothly into the shelf structure, which preferably flares laterally out from it. It is preferred that the shelf portion adjoin the lip less than about one (1 cm) centimeter from the bottom of the cavity and more preferred that the shelf portion adjoin the lip less than about five (5 mm) millimeters from the bottom of the cavity.

The shelf portion directs the growth of the oyster shell by providing a direction of least resistance in a preferred or desired direction. The shelf extension may slope or arc from the lip in any direction, but it is preferred that the shelf portion slope or arc slightly upward from the bottom of the cavity. It is also preferred that the shelf portion have a slope of between about zero and thirty (0°–30°) degrees and more preferred that the shelf have a slope of between about zero and fifteen (0°–15°) degrees, providing a soft, concave surface upon which the oyster can grow.

The holder of the present invention may also include a means for attaching the holder to a support apparatus. The support apparatus may be any apparatus that can keep the holder in an identifiable location and desired disposition within a marine environment once the holder, including the attached oyster, is placed therein or thereon. Appropriate apparatus would include such means as string or net matrix suspended from a float, and rigid members extending from the water bottom or other anchoring device(s).

The means for attaching the holder to an appropriate support apparatus or surface may include any commonly known method such as clips, pins, adhesives, "hooks and loops" ("velcro™" type) or other types of interlocking members, etc., or the holders with the oysters affixed to them could be laid on a submerged, horizontally disposed surface.

At least a portion of the holder must be constructed of a material to which an oyster may adhere. It is preferred that the cup-like member be constructed or molded from, for example, a plastic material that will retain an identifiable shape and not corrode when emersed in a marine environment for a period of at least, for example, about six (6) months, and it is more preferred, for reasons of economy in production, that the entire holder be constructed of such plastic and be capable of being blow molded.

As previously stated, the cavity should be of a size to allow at least a portion of a juvenile oyster or seedling to be retained therein. It is preferred that the lip defining the cavity be elliptical or circular and have a circumference about three and nineteen (3–19 cm) centimeters and have a higher back-wall. However, a preference for this particular configuration should not be construed to limit a holder embodying the invention herein described to a particular shaped lip or cavity.

Also described is a method of growing individual oysters. The method comprises the steps of: a) providing a holder for each oyster having a cup-like member having a lip defining a cavity, the cavity having a size sufficient to at least partially receive therein a juvenile or seedling oyster prior to the juvenile or seedling oyster's setting and including a surface having at least one aperture formed therethrough, the aperture having dimensions sufficient to prevent a juvenile or seedling oyster placed in the cavity from passing through the aperture; b) positioning the cup-like member in a first aqueous environment suitable for the biological support of a juvenile or seedling oyster in a manner such that a juvenile or seedling oyster placed at least partially within the cavity remains therein; c) placing a juvenile or seedling oyster at least partially within the cavity, and, d) allowing the juvenile oyster to remain at least partially within the cavity within the first aqueous environment for a period of time (e.g. a number of months) sufficient to allow the juvenile oyster to become set to the member.

In placing the oyster seedling in the cavity, it preferably is placed flat with its hinge portion located at or directed toward the rear of the cavity, i.e., away from the shelf portion, which helps direct the growth toward and over the shelf portion of the holder.

Of course the delineation herein of the steps of the method in a particular order should not be construed to limit the order in which the steps may logically be performed. For instance, it is, of course, possible and within the scope of the method of the invention to place the juvenile or seedling oyster at least partially into the cavity prior to positioning the cup-like member into the first aqueous environment.

In a preferred embodiment of the method the following steps are performed after the oyster has become adhered to the holder: e) attaching the holder, including the oyster integrally attached thereto, to a support means for supporting the member in a second aqueous environment having a bottom surface and that is suitable for the biological support of growing oysters; and f) placing the support means within the second aqueous environment in a manner such that the location of the oyster is readily identifiable at a later date. It should be noted that providing any of the preferred embodiments of holder is satisfactory to practice step (a) of the method hereinbefore described.

The foregoing, generally described invention fulfills all of the objects listed above.

Additionally, with the use of the protective growing possible through the use the invention, the holder and its related methodology prevents, for example, blue crabs and snails from destroying the baby or juvenile oysters or spat, and, thus, these predators cannot bother the oysters. This results in great savings and a better quality oyster.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 2 is a side view of the embodiment of FIG. 1; while

EXEMPLARY MODE FOR CARRYING OUT THE INVENTION

FIGS. 1–4 are top, side, bottom, front and end views, respectively, of a preferred, exemplary embodiment of the over-all oyster holder 10 of the present invention, used to grow an oyster from its initial stage to its fully grown stage. The holder 10 includes a cup-like member 12 at its rear and a flared, shelf extension portion 14 at its front. The cup-like member 12 and the shelf extension portion 14 preferably are integrally formed in a single unit from an appropriate plastic.

Figure 1A:
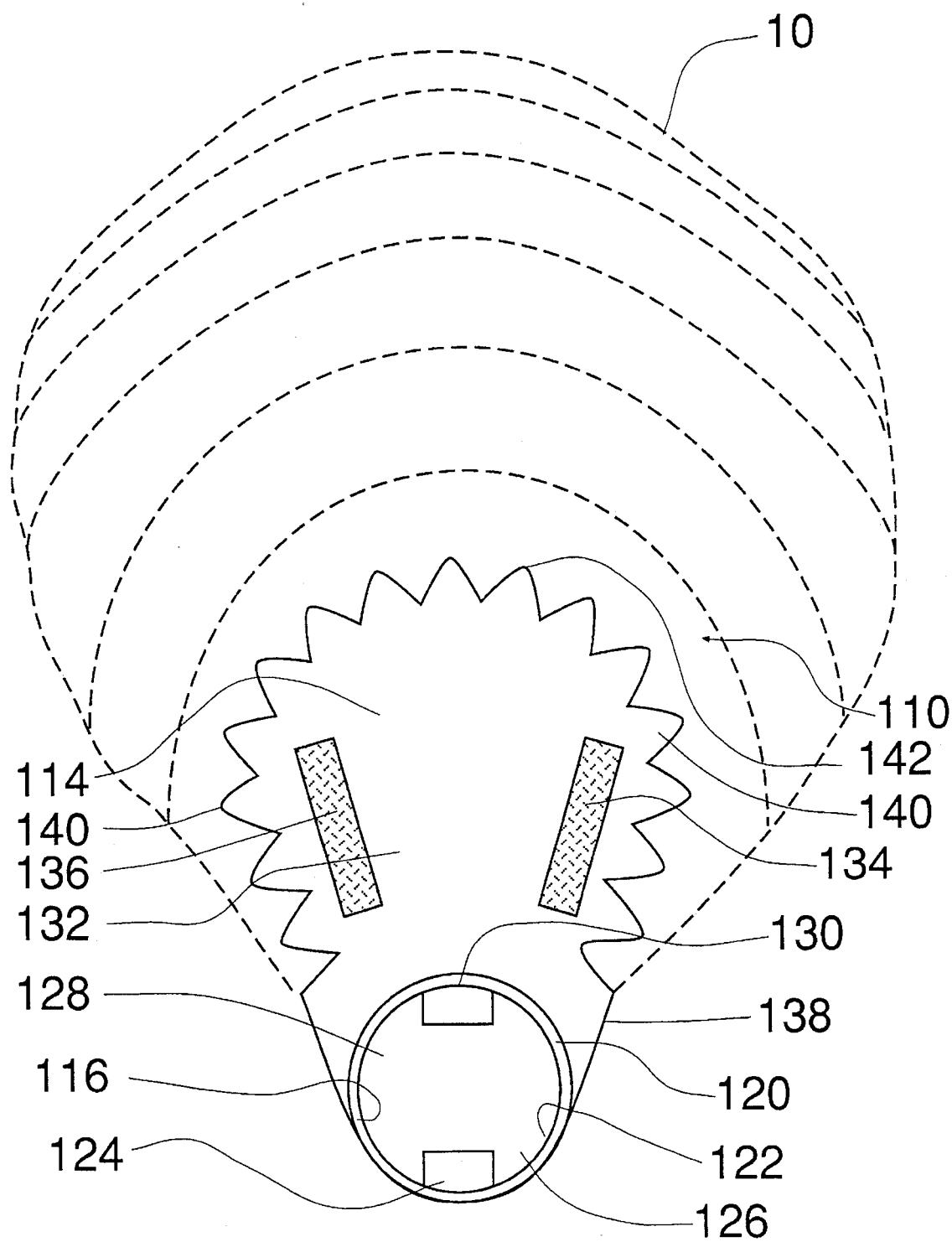
FIG. 1A is a top or plan view of a alternative, exemplary embodiment of the oyster holder, for an oyster to be grown in, in accordance with the present invention, illustrating an alternative placement of the apertures in the cup-like member, apertures in the shelf extension portion in place of protrusions, and a smooth, curved periphery for the shelf extension portion and with the outline of an exemplary, fully grown oyster being shown in phantom line.

The cup-like member 12 includes a cylindrical cavity 16, having an open top 18 defined by a circular, peripheral lip 20, and an interior surface 22 having two, front and rear apertures 24, 26, respectively, therethrough. Alternatively, as illustrated in FIG. 1A, the two apertures could be placed at the rear end of the cup-like member flanked from one another and on opposite sides of the center line of the holder 10, with the apertures in both embodiments extending preferably through the adjacent side walls as well as the bottom of the cylindrical cavity. With respect to the alternative embodiment of FIG. 1A, it is noted that like reference numbers were used for substantially identical or at least comparable parts, which in the case of identical parts are not discussed in detail herein to avoid unnecessary redundancy.

In the preferred embodiments, the cavity 16 has a circular shaped, bottom surface 28 and a circular shaped lip 20. The bottom surface 28 has an exemplary diameter of about one and eight-tenths (1.8 cm) centimeters. At its lowest point 30, the upper lip 20 is, for example, about three (3 mm) millimeters from the bottom surface 28, which is a measure of its minimum depth, while at its higher point 31, the upper lip is, for example, about one and a quarter (1.25 cm) centimeters from the top, which is a measure of its maximum depth, the higher back side of the lip at area 31 tending to cause a juvenile oyster to grow out over the front side of the cavity 12 over and onto the bottom surface 32 of the shelf extension 14. The shelf extension 14 provides an appropriately configured surface upon which the oyster can expand in its growth.

As noted the apertures 24/26 (124/126) are formed partially through the bottom surface 28 and partially through the interior surface 22. Each of the apertures 24/26 (124/126) has an exemplary aperture area of about five (5 #mm) square millimeters. The use of two apertures 24/26 (124/126) in this preferred embodiment, increases the flow of water through cavity 16 and thereby increases the availability of food and the removal of waste products, as well as provide an initial anchoring area for the oyster seedling, which typically is about fingernail size, to anchor itself to the cavity of the holder 10.

The shelf portion 14 adjoins and radially extends and flares laterally out from the cup-like member 12, providing up to near its distal end an ever increasing width, and includes a slightly cupped, directing or guiding surface 32 to support and guide the oyster's growth, two attachment protrusions or structures 34, 36, and an irregular, peripheral edge 38 having serrations 40. In this preferred the embodiment, the attachment structures 34, 36 are rectangularly shaped, radially extended protrusions extending or protruding up from the directing surface 32. Each attachment structure or protrusion 34, 36 is, for example, about one (1 cm) centimeters long, about two (2 mm) millimeters wide and extends or protrudes upwardly from the directing surface 32 about three (3 mm) millimeters. The length of the shelf portion 14, as measured from point 30 to point 42, is, for example, about three and one-half (3.5 cm) centimeters.

Figure 1:
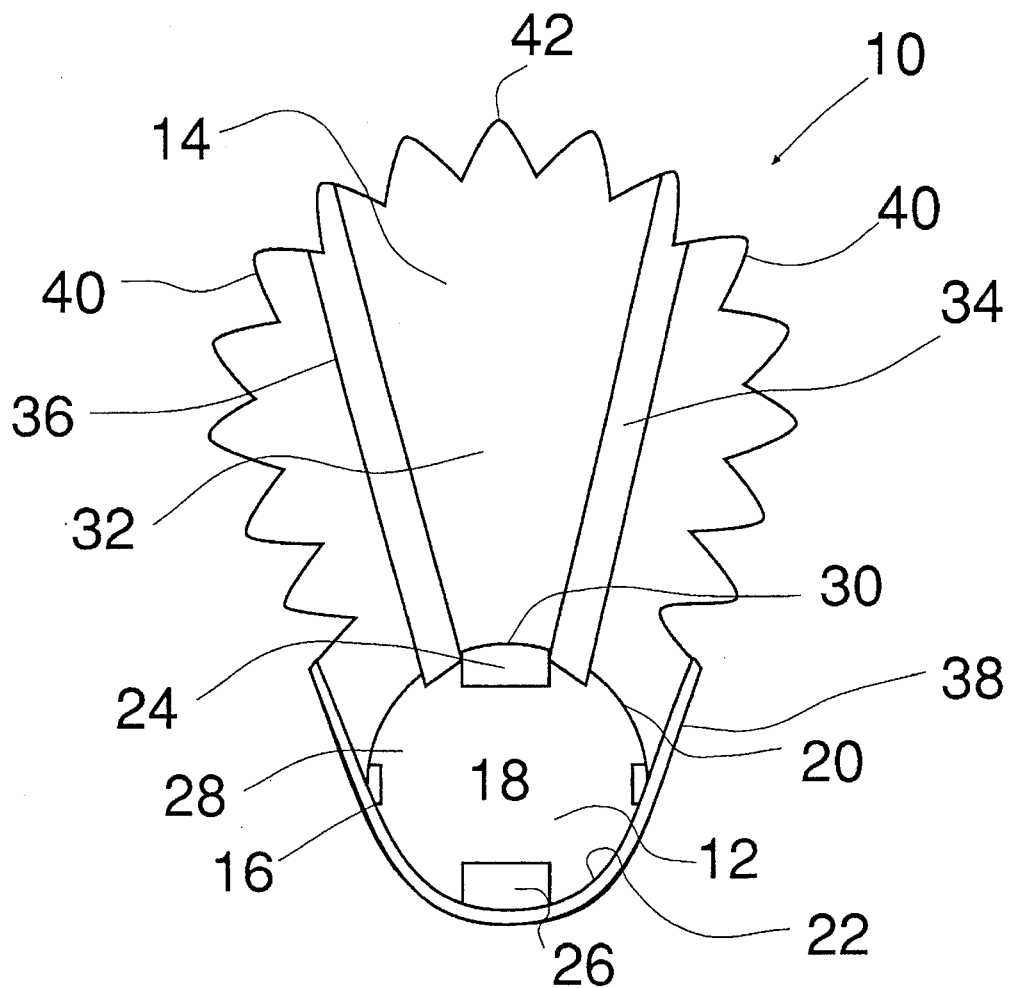
FIG. 1 is a top or plan view of a preferred, exemplary embodiment of the oyster holder, for an oyster to be grown in, in accordance with the present invention, illustrating its cup-like member and its shelf extension portion.
Figure 2:
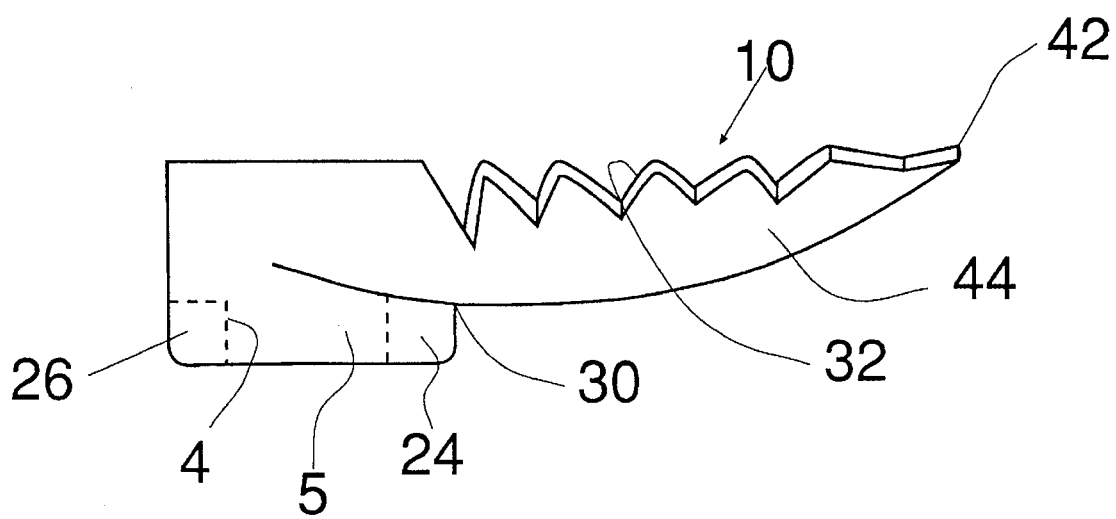
Figure 4:
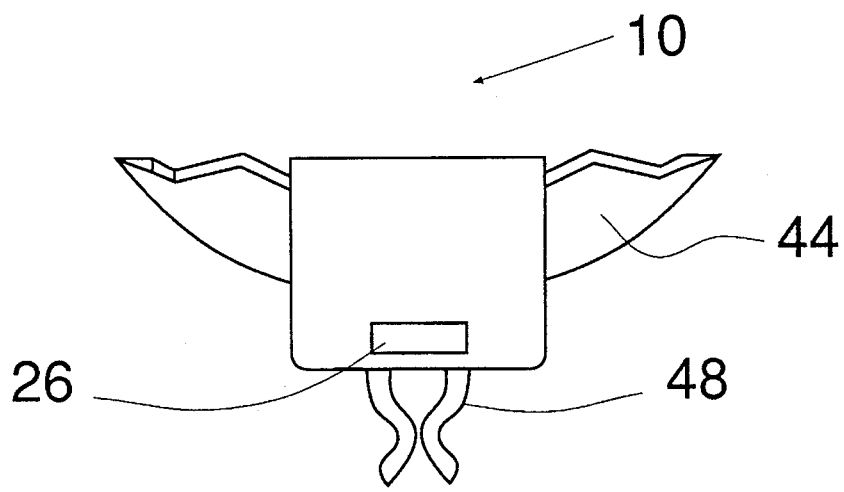
FIG. 4 is a rear view of embodiment of FIG. 1, illustrating the rear of the cup-like member and part of the rear of the shelf extension portion of the oyster holder.
Figure 5:
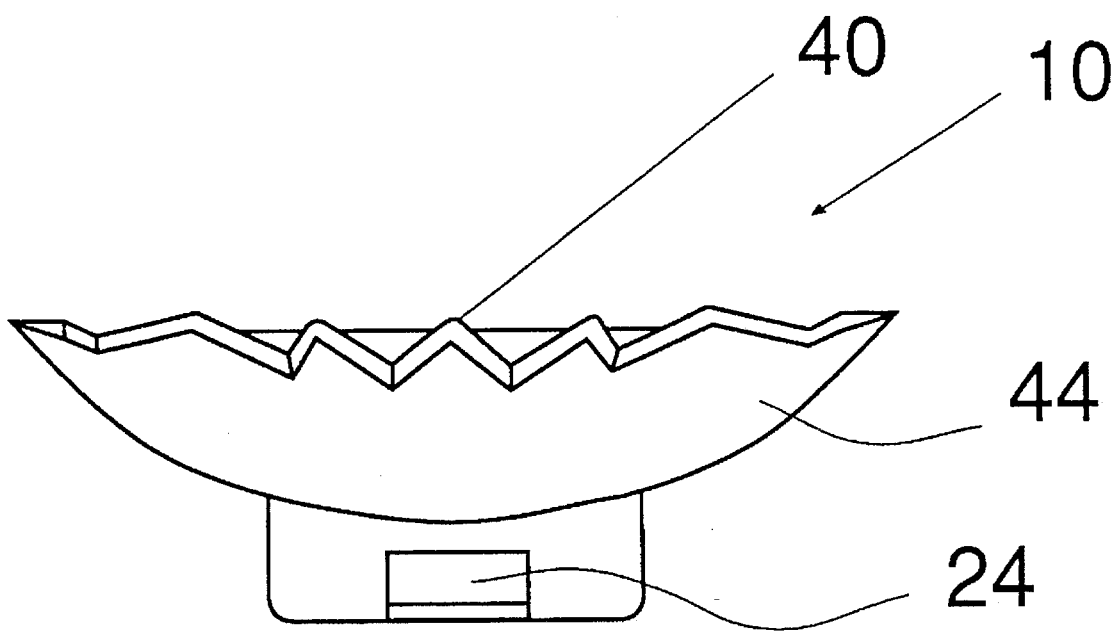
FIG. 5 is a front view of embodiment of FIG. 1, illustrating the front of the shelf extension portion and the front of the cup-like member of the oyster holder.

The softly curved, cupping-like shape of the directing or guiding surface 31 is more clearly shown with reference to FIGS. 2 and 4 & 5. Shown in the figure is the back, bottom or underside surface 44 of the directing surface 32. The directing surface 32 arcs upward from point 30 to point 42 for a total rise of about one (1 cm) centimeter. The shelf extension 14 thus provides a further extended surface for increased growth area for the underside of the lower half of the oyster's shell, further allowing them to become integrated, firmly and affixedly attached together, as if they were one and the same structure.

Figure 3:
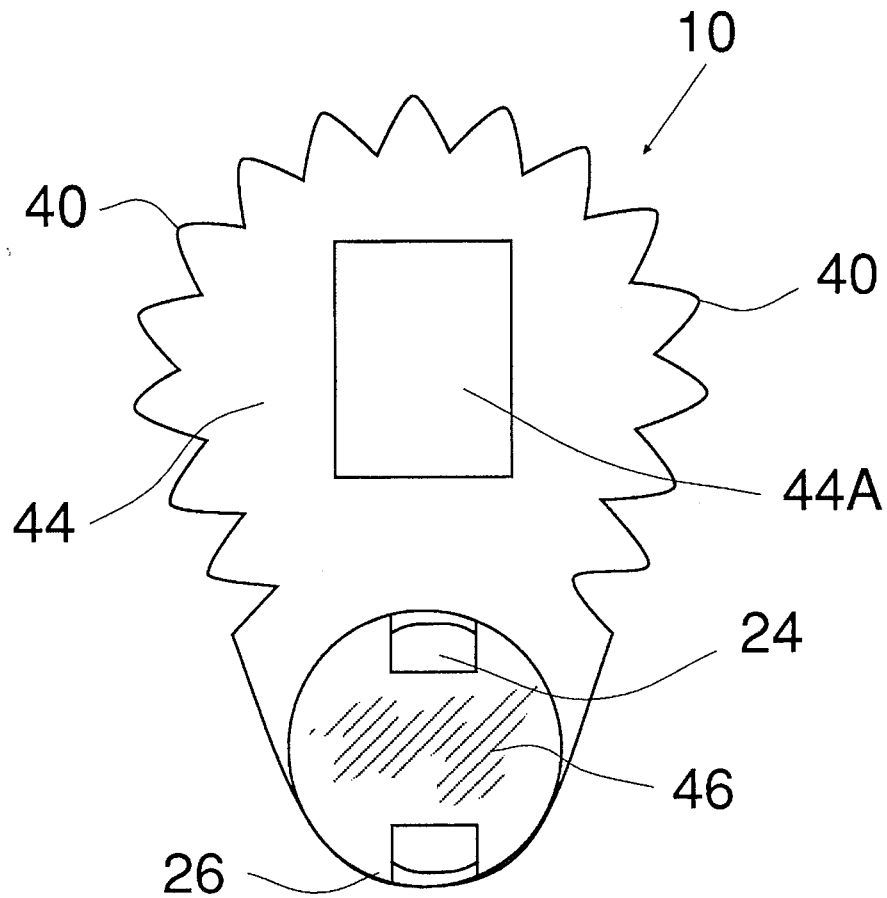
FIG. 3 is an underside view of the embodiment of FIG. 1.

FIG. 3 is an underside view of the holder 10, showing the back surface 44, the flat, under or back surface 46 of the bottom surface 28, the serrations 40 and the apertures 24, 26. Either or both of back surfaces 44, 46 may be used for, for example, labeling surfaces containing, for example, producer and/or growth area indicia or information, with the central potion 44A providing a relatively large, flat, rectangular area particularly suited for labeling purposes.

In this preferred embodiment the underside surface 44 (particularly flat area 44A) of the shelf 14 is used for labeling purposes, and the underside surface 46 of the member 12 is used as an attachment surface when holder 10, containing an attached oyster, is placed into the aqueous environment for the oyster to mature. In this preferred embodiment the underside surface 46 is flat to aid, for example, in adhesive bonding of the cup-like member 10. However, as shown in FIG. 4, the underside surface 46 could have other attachment devices, such as, for example, a clip 48 formed thereon to attach the holder 10 to a mesh netting or other interlocking structure.

FIG. 5 is a frontal view of the holder 10 showing its peripheral serrations 40 and the front aperture 24. However, as shown in the alternative embodiment of FIG. 1A, the peripheral edges of the shelf portions 114 alternatively could be smooth and continuous.

It should be noted and understood that the dimensions provided in various places above are exemplary, although highly preferred in some instances, and that all of them are subject to great variation. Additionally, while the illustrated configurations and contours of the various parts of the holder are preferred, they likewise are subject to great variation.

Method of Use

The preferred use of the oyster holder 10 is as follows: an individual juvenile or seedling oyster or spat "S" (note FIG. 2), which typically is part of a large batch of spat obtained from a hatchery and each of which is then about a half (½") inch in size (comparable to the size of the human fingernail) is placed at least partially and preferably completely down within the cavity 16. As can be seen in FIG. 2, each individual seedling oyster or spat "S" is preferably positioned flat down into the bottom of its respective cavity 16 on the bottom surface 28 and juxtaposed to or placed over the apertures 24/26 (124/126), preferably with its hinge portion "H" located at or directed toward the rear [ie., at 26 (124/126)] of the cavity 16, i.e., away from the shelf portion 14. This initial disposition of the spat "S" with respect to being laid flat with its hinge "H" away from the shelf 14 is important to ensuring the proper subsequent growth of the juvenile oyster on the holder 10.

Each of the holders 10, each with an individual oyster spat in it, is then placed in an aqueous environment, typically in a protective or indoor facility suitable for the biological support of growing juvenile oysters. Of course, hundreds or thousands of such holder-oyster combinations typically would be handled, in the manner detailed above, in the same general time frame.

The level of the aqueous environment should be low enough to keep the juvenile or seedling oysters or spat trapped within their respective cavities 16 at least long enough for each of the juvenile or seedling oyster to set, or attach or otherwise anchor itself, to the oyster holder 10. In addition, there should be enough circulation in the aqueous environment to supply the juvenile oysters with sufficient nutrients and waste removal to promote their growth.

Once the oysters have set to their respective holders 10, the level of the aqueous environment may be raised to any desired level, and the juvenile oysters thereafter allow to grow, typically for a period of some months, to a size at least suitable for subsequent placement preferably in an open, marine environment.

Thus, over a few months period of time, the juvenile oysters become firmly affixedly attached to their respective holders 10, at which time they can be, for example, moved to another location, for example, an outdoor, natural environment, such as a regular water bottom, lake, gulf or stream. As described previously, the placing of the oysters attached to their respective holders onto a oyster maturing surface, such as netting or the like, may be accomplished in a variety of ways.

The oysters are then allowed to reach their full, mature growth, during which time each oyster further integrates its respective holder 10 into its shell and typically ultimately covers over the full extent of the holder (note dashed outline "O" in FIG. 1A generally indicating a fully grown oyster), including the shelf extension portion 14. At this time the grown oysters can be harvested, and labeling indicia, if not previously added or presented, can now be added to, for example, the central areas 44A of the under surfaces 40 of the shelf portions 14.

Thereafter, the harvested oysters are presented to the ultimate consumers with the holders 10 (with their displayed informational indicia) integrated to their respective oyster half-shells.

The invention, in its preferred embodiments, thus provides a system which is used to label and identify each individual oyster. The use of the invention's labeling will remove oysters from the generic class of "no name, no blame." The labeling aspects of the invention can be used, not only with the off-bottom culture growing methods described above, but also as well as well with the bottom culture type of approach, if so desired.

Although the cylindrical, curved configuration of the illustrated holder 10 is preferred, the holder could be made flat, straight and rectangular in its over-all configuration, if so desired.

It is noted that, as used herein, the term "oyster" is generally intended to include all mollusks or bi-valves which can be placed, when in their infantile state, into a holder and which will thereafter incorporate and become attached to the holder in its normal growth process. Additionally, "cup-like" refers generally to a device having a bottom surface with one or more side wall portion(s) which tend to keep an item on the bottom surface from moving off of that surface.

It is noted that the embodiments described herein in detail for exemplary purposes is of course subject to many different variations in structure, design, application and methodology. Because many varying and different embodiments may be made within the scope of the inventive concept(s) herein taught, and because many modifications may be made in the embodiments herein detailed in accordance with the descriptive requirements of the law, it is to be understood that the details herein are to be interpreted as illustrative and not in a limiting sense.

I claim:

1. A holder for growing an individual oyster, comprising:
   a cup-like member having
      a lip defining a cavity suitable for the emplacement of an oyster spat within it, said cavity having a size sufficient to at least partially receive therein an oyster spat prior to its setting and including a surface having at least one aperture formed therethrough, said at least one aperture having dimensions sufficient to prevent an oyster spat placed in said cavity from passing through said at least one aperture but of sufficient size to permit the shell of the spat to grow into said at least one aperture; and
      a shelf portion adjoining said lid suitable for directing the direction of oyster Shell growth in a desired direction.

2. The oyster holder of claim 1, wherein:
   said shelf portion includes a structure to which the oyster shell can become permanently attached as the oyster shell naturally grows.

3. The oyster holder of claim 1, wherein:
   said shelf portion has a underside surface having structure suitable for presenting informational indicia.

4. The oyster holder of claim 1, wherein:
   said shelf portion includes a peripheral edge having serrations thereon.

5. The oyster holder of claim 1, wherein:
   said shelf portion adjoins said lip less than about three centimeters from a bottom surface of said cavity.

6. The oyster holder of claim 1, wherein:
   said cup-like member includes an attachment suitable for attaching said cup-like member to a suspension device.

7. The oyster holder of claim 1, wherein:
   said cup-like member is constructed from a plastic material that retains an identifiable shape and will not corrode when immersed in a marine environment for a period of at least about six (6) months.

8. The oyster holder of claim 1, wherein:
   the circumference of said lip defining said cavity is between about three and nineteen (3–19 cm) centimeters; and
   the volume of said cavity is between about thirty and one thousand (30–1,000 cu. cm) cubic millimeters.

9. A method of growing an individual oyster, comprising the following steps;
   a) placing an oyster spat into a member having a lip defining a cup-like cavity, said cavity having a size sufficient to at least partially receive therein an oyster spat prior to it setting and including a surface having at least one aperture formed therethrough, said at least one aperture having dimensions sufficient to prevent an oyster spat placed in said cavity from passing through said at least one aperture but of sufficient size to allow the spat's shell to grow into said at least one aperture and to allow water flow through the aperture.
   b) positioning said cup-like member in a first aqueous environment suitable for the biological support of a growing juvenile oyster in a manner such that the growing juvenile oyster placed at least martially within said cavity remains therein; and
   c) allowing said growing juvenile oyster to remain at least partially within said cavity within said first aqueous environment at least for a period of time sufficient to allow the juvenile oyster to become set and affixed to said member;
   d) removing said member, along with a number of other such members, each with a juvenile oyster affixed to it, and attaching all of said members to a support surface to support said members and said juvenile oysters affixed thereto down into a second aqueous environment suitable for the biological support of growing oysters and having a water bottom surface; and
   e) placing said support surface with said attached members and their affixed juvenile oyster down within said second aqueous environment above said water bottom surface and allowing the juvenile oysters to further grow and integrate their respective members into their shells.

10. The method of claim 9, wherein said member includes attachment means for attaching it to a support surface; and wherein in step "d" there is included the further step of:

using said attachment means to attach said member to said support surface.

11. A method of growing an individual oyster, comprising the following steps:

a) placing an oyster spat into a member having a lip defining a cup-like cavity and a shelf extension portion having an upper, directing surface for guiding the direction of shell growth, said cavity having a size sufficient to at least partially receive therein an oyster spat prior to its setting and including a surface having at least one aperture formed therethrough, said at least one aperture having dimensions sufficient to prevent an oyster spat placed in said cavity from passing through said at least one aperture but of sufficient size to allow the spat's shell to grow into said at least one aperture and to allow water flow through the at least one aperture;

b) positioning said cup-like member in a first aqueous environment suitable for the biological support of a growing juvenile oyster in a manner such that the growing juvenile oyster placed at least partially within said cavity remains therein; and c) allowing said growing juvenile oyster to remain at least partially within said cavity within said first aqueous environment at least for a period of time sufficient to allow the juvenile oyster to become set and affixed to said member; and d) maintaining the member and the affixed oyster spat down in an aqueous environment while its grows into a juvenile oyster and then ultimately while it further grows into a larger oyster, while the juvenile oyster grows from the cavity out onto the shelf portion and ultimately covers over the cavity and at least most of the upper surface of said shelf portion, affixedly integrating the cavity and shelf portion into its shell.

12. The method of claim 11, wherein there is further included the step of:

providing information indicia on the underside surface of said member which is viewable by the end user of the grown oyster.

13. The method of claim 11, wherein there is further included the step of:

providing information indicia on the underside surface of said member, including at least the geographical location of where the oyster was grown; and maintaining the integration of said member onto said oyster all the way to the point where the oyster is opened and presented to the consumer on the half-shell, allowing the consumer to check from where the oyster being consumed came.

14. A method of growing an individual oyster, comprising the following steps:

a) placing an oyster spat into a member having a lid defining a cup-like cavity, said cavity having a size sufficient to at least partially receive therein an oyster spat prior to its setting and including a surface having at least one aperture formed therethrough, said least one aperture having dimensions sufficient to prevent an oyster spat placed in said cavity from passing through said at least one aperture but of sufficient size to allow the spat's shell to grow into said at least one aperture and to allow water flow through the at least one aperture, and a shelf portion adjoining said lid suitable for directing the direction of oyster shell growth in a desired direction, including in said placing the further step of placing the oyster spat flat down in said member with its hinge directed away from said shelf portion;

b) positioning said cup-like member in a first aqueous environment suitable for the biological support of a growing juvenile oyster in a manner such that the growing juvenile oyster placed at least partially within said cavity remains therein; and c) allowing said growing juvenile oyster to remain at least partially within said cavity within said first aqueous environment at least for a period of time sufficient to allow the juvenile oyster to become set and affixed to said member.

15. An oyster holder for growing an individual oyster, comprising:

a member having a lip defining a cup-like cavity having a bottom surface, said cavity having a size sufficient to at least partially receive therein a juvenile oyster prior to said juvenile oyster's setting and including a surface having at least one aperture formed therethrough, said at least one aperture having dimensions sufficient to prevent a juvenile oyster placed in said cavity from passing through said at least one aperture, the circumference of said lip defining said cavity to have a diameter between about three and nineteen (3–19 cm) centimeters, the volume of said cavity being between about thirty and one thousand (30–1,000 cu. mm) cubic millimeters; and a shelf portion adjoining said lip and extending radially out therefrom for directing and supporting the direction of shell growth in a desired direction over and along said shelf portion, said shelf portion including a structure to which the shell can become permanently attached as the shell grows.

16. The oyster holder of claim 15, wherein:

said shelf portion flares out from the side of said cavity, increasing in width further out away from its closest contact with said cavity.

17. The oyster holder of Claim 15, wherein:

said shelf portion adjoins said lip less than about three centimeters from a bottom surface of said cavity.

18. The oyster holder of claim 15, wherein:

said cup-like cavity is constructed from a plastic material that retains an identifiable shape when immersed in a marine environment for a period of at least about six (6) months.

* * * * *